United States Patent
Vaillant et al.

(10) Patent No.: US 6,643,392 B1
(45) Date of Patent: Nov. 4, 2003

(54) PROCESS FOR RECONSTRUCTING A TRIDIMENSIONAL IMAGE OF A MOVING OBJECT

(75) Inventors: Régis Vaillant, Villebon sur Yvette (FR); Yves Trousset, Palaiseau (FR); Jean Lienard, Clamart (FR); Francisco Sureda, Chatenay Malabry (FR)

(73) Assignee: GE Medical Systems SA, Buc (FR)

( * ) Notice: Subject to any disclaimer, the term of this patent is extended or adjusted under 35 U.S.C. 154(b) by 539 days.

(21) Appl. No.: 09/667,067

(22) Filed: Sep. 21, 2000

(30) Foreign Application Priority Data

Sep. 24, 1999 (FR) .............................. 99 11959

(51) Int. Cl.$^7$ ................................. G06K 9/00
(52) U.S. Cl. ................... 382/132; 600/413; 600/443; 600/437
(58) Field of Search ................... 382/100, 107, 382/128, 129, 130, 131, 132, 133, 197, 134, 262; 378/4, 8, 9, 87, 197, 901; 600/410, 415, 419, 420, 407, 424, 443, 437, 461, 523; 324/306, 309, 312, 318; 128/653, 916

(56) References Cited

U.S. PATENT DOCUMENTS

| | | | | |
|---|---|---|---|---|
| 4,523,596 A | * | 6/1985 | Macovski et al. | 600/413 |
| 5,111,820 A | * | 5/1992 | Axel et al. | 600/413 |
| 5,245,282 A | * | 9/1993 | Mugler, III et al. | 324/309 |
| 5,383,231 A | | 1/1995 | Yamagishi | 378/15 |
| 5,406,478 A | * | 4/1995 | Delageniere et al. | 378/19 |
| 5,889,525 A | | 3/1999 | De Murcia et al. | 345/420 |
| 5,924,991 A | * | 7/1999 | Hossack et al. | 600/443 |
| 6,047,080 A | * | 4/2000 | Chen et al. | 382/128 |

FOREIGN PATENT DOCUMENTS

| | | |
|---|---|---|
| FR | 2644590 | 9/1990 |
| FR | 2656129 | 6/1991 |
| FR | 2252975 | 3/1998 |
| WO | 9907283 | 2/1999 |

OTHER PUBLICATIONS

Demurcia et al, "Spato–Temporally Regularized Reconstruction of Gated Spect Myocardial Images Sequences" International Conference on Image.
Processing of 3rd IEEE International Conference on Image Processing, Sep. 16–19, 1996, Lausanne, Switzerland, pp 721–724, vol. 2.
Gordon et al, "Algebraic Reconstruction Technique for Tridimensional Electron Microscopy and X–ray Photography.", J. of Thed. Biol. 29, pp 471–481 (1970).
Singh et al, "Image Flow Computation: an estimation–Theoretic Framework and a Unified Perspective", CVGIP, vol. 56, No. 2, Sep. 1992, pp 152–177.

* cited by examiner

Primary Examiner—Jayanti K. Patel
Assistant Examiner—Abolfazl Tabatabai
(74) Attorney, Agent, or Firm—Jay L. Chaskin; Cantor Colburn LLP

(57) ABSTRACT

A process for reconstructing a tridimensional image of an object moving with a substantially cyclic motion, for example the vessels of the human heart, in which, for an acquisition duration extending over several cycles of the movement of the object, an acquisitio of a plurality of initial digital radiographic images is performed using a snapshot apparatus rotating around the object. Initial images having the same temporal occurrence in the course of each cycle are selected respectively in successive cycles so as to form a group of images which is associated with this same temporal occurrence. Several different groups of initial images corresponding respectively to several different temporal occurrences are formed. An intermediate tridimensional representation of the object is reconstructed on the basis of each group of initial images and of an iterative image reconstruction algorithm. A law of spatial deformation between two intermediate tridimensional representations is formulated on the basis of the two intermediate tridimensional representations corresponding to two successive temporal occurrences, and a final tridimensional representation of the object is reconstructed on the basis of the initial images successively acquired, of the spatial deformation laws successively formulated and of an iterative image reconstruction algorithm.

8 Claims, 2 Drawing Sheets

PROCESS FOR RECONSTRUCTING A TRIDIMENSIONAL IMAGE OF A MOVING OBJECT

BACKGROUND OF THE INVENTION

Figure 1:
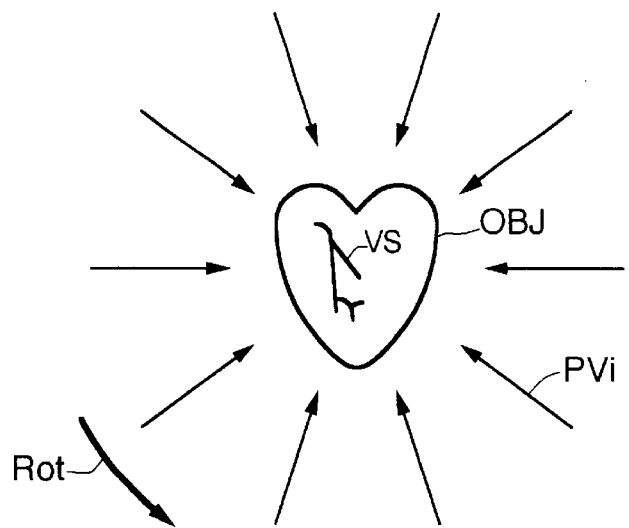
Figure 1:
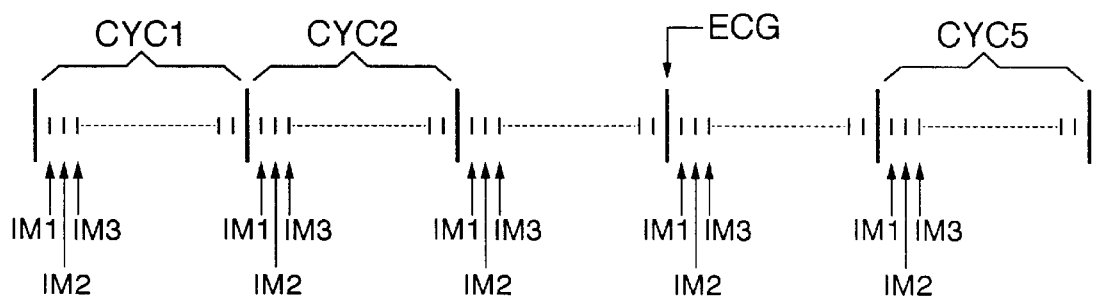

The invention relates to the reconstruction of a tridimensional image of a moving object, in particular moving with a substantially cyclic motion.

The invention finds a particularly interesting application in the medical field, in which the reconstruction of the internal structures of patients under examination, in particular the reconstruction of images of vessels of the heart, is undertaken.

The invention can however find applications in other fields, especially in industrial non-destructive testing in which examinations of the same type as medical examinations are carried out.

The tridimensional reconstruction of images is generally performed on the basis of bidimensional projected images of the object. However, difficulties arise in this image reconstruction when the object is moving, as is the case for the heart.

Another difficulty encountered in the reconstruction of tridimensional images on the basis of bidimensional images resides in the difficulty of matching between the images, that is to say of being able to tag with minimum error the same elements of the object, for example certain vessels, from one image to another. The difficulty is further increased here owing to the movement of the object, for example the heart.

Certain reconstruction techniques require the intervention of the user, in this instance the doctor, to solve the matching problems more easily.

BRIEF DESCRIPTION OF THE INVENTION

The invention proposes a fully automatic reconstruction of images of a moving object, and which requires minimum, or even zero interaction with the doctor.

In an embodiment of the invention proposes a process for reconstructing a tridimensional image of an object moving with a substantially cyclic motion, for example the vessels of the human heart, in which, for an acquisition duration extending over several cycles of the movement of the object, an acquisition of a plurality of initial digital radiographic images is performed using a snapshot apparatus rotating around the object. Initial images having the same temporal occurrence in the course of each cycle are selected respectively in successive cycles in such a way as to form a group of images which is associated with this same temporal occurrence. Several different groups of initial images corresponding respectively to several different temporal occurrences are formed. An intermediate tridimensional representation of the object is reconstructed on the basis of each group of initial images and of an iterative image reconstruction algorithm. A law of spatial deformation between two intermediate tridimensional representations is formulated on the basis of the two intermediate tridimensional representations corresponding to two successive temporal occurrences, and a final tridimensional representation of the object is reconstructed on the basis of the initial images successively acquired, of the spatial deformation laws successively formulated and of an iterative image reconstruction algorithm.

An embodiment of the invention makes it possible ultimately to obtain a tridimensional representation of the object which takes its movement into account. The user, in this instance the doctor, can then easily be provided, on his screen, with a projected bidimensional image of this object on the basis of the final tridimensional representation obtained. Moreover, given that successive laws or models of spatial deformation corresponding to different temporal occurrences have moreover been formulated, it is also possible to provide the user, for example the doctor, with projected bidimensional images of the object, and especially of certain vessels, at successive time instants.

Stated otherwise, the process according to the invention allows the reconstruction of an image in "four" dimensions, namely a tridimensional image furthermore assigned a time parameter.

The selection, in the successive cycles, of the images having the same temporal occurrence can be performed by using an auxiliary control signal representative of the cyclic motion of the object. Thus, it will be possible to use a physiological signal such as for example an electrocardiogram representative of the movement of the heart and making it possible to determine accurately the cycles of the cardiac movement.

BRIEF DESCRIPTION OF THE DRAWING(S)

Figure 2:
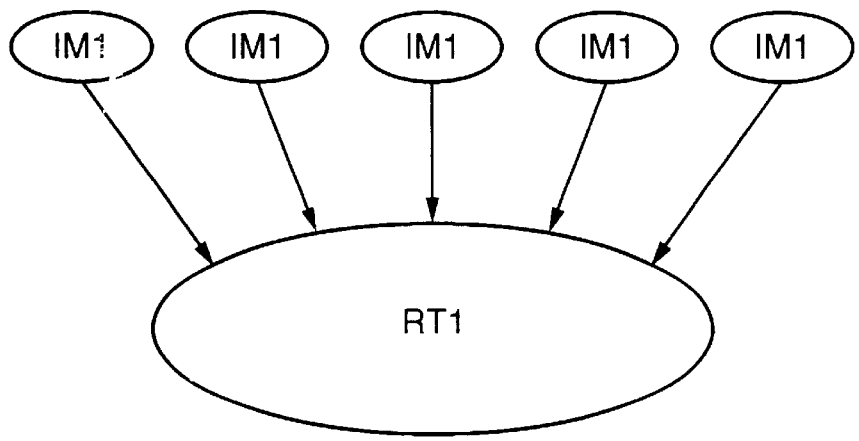
Figure 3:
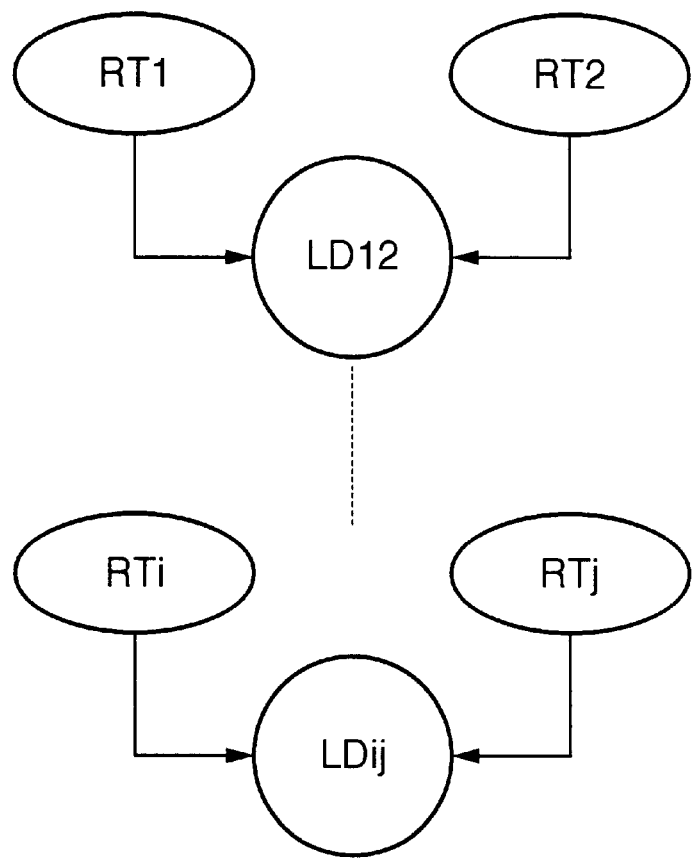
Figure 4:
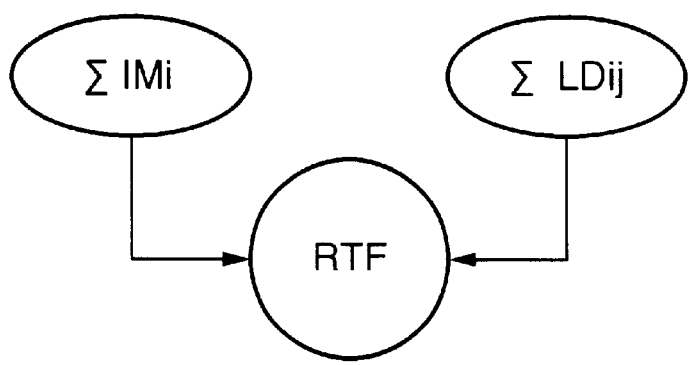

Other advantages and characteristics of the invention will become apparent on examining the detailed description of a non-limiting mode of implementation and of the appended drawings in which:

FIG. 1 illustrates an acquisition of digital radiographic images in a cardiac application, and FIGS. 2 to 4 very schematically illustrate the various steps making it possible to obtain the final tridimensional representation of the object.

Although the invention is not limited thereto, the application of the process according to the invention to the reconstruction of an image of vessels VS of the heart OBJ of a patient will now be described.

DETAILED DESCRIPTION OF THE INVENTION

In FIG. 1, the references PVi designate various snapshots acquired by rotating Rot an X-ray source (not represented here for the sake of simplification) around the chest of the patient.

Each initial image acquired IMi is obtained on the basis of a bidimensional radiation detector, for example of the luminance amplifier type used in radiology, disposed opposite the X-ray tube in a projection plane.

In the case of an X-ray imaging system composed of an X-ray source and a bidimensional detector, the geometrical operation involved in producing the image acquired is a conical projection of an analysed object deployed in a three-dimensional space, onto a two-dimensional space which is that of the projection plane corresponding to the detection plane. The calibration of an imaging system, that is to say the operation which culminates in accurate indirect knowledge of the geometrical parameters which are involved in producing an image is conventional and well known to the person skilled in the art.

As illustrated in FIG. 1, a continuous acquisition is performed for a predetermined duration, for example 5 seconds, corresponding to 5 cycles CYC1–CYC5 of the movement of the heart. With an acquisition rate of 10 images per second, substantially 10 acquired initial images are therefore obtained per cycle of the cardiac movement.

The cycles of the cardiac movement are tagged by using an auxiliary control signal ECG, which can be in this instance an electrocardiogram. The systolic and diastolic phases of the movement of the heart are thus determined in particular.

Once the acquisition of the initial stages has been performed, an initial image, whose temporal occurrence is the same for all the cycles, is selected in each cycle. For example, the first initial image IM1 after the start of the cycle of the cardiac movement is selected, five initial images IM1 (FIG. 2) are then obtained on the basis of which a reconstruction of an intermediate tridimensional representation of the vessels VS of the heart is performed using an iterative image reconstruction algorithm. The principle of such an iterative image reconstruction algorithm is fully known to the person skilled in the art and has already formed the subject of numerous publications. Mention will be made in particular of the article by Gordon, Bender, and Herman entitled "Algebraic reconstruction technique for tridimensional electron microscopy and X-ray photography", Journal of Theol. Biol. 29, pages 471 to 481 (1970) or else French patent applications no. 89 0306 or 89 16906.

The process for reconstructing a tridimensional image of an object as described in French patent application no. 2 752 975 can also be implemented.

The person skilled in the art will be able to refer to these prior art documents for further details regarding a mode of implementation of the image reconstruction algorithm and/or the phase for calibrating the snapshot apparatus.

At the conclusion of this intermediate reconstruction step, a first intermediate tridimensional representation of the blood vessels of the heart RT1 is obtained. The same operations are performed with the images IM2, each initial image IM2 of the cycle being the second initial image acquired after the start of the cycle. A second intermediate tridimensional representation RT2 is then obtained.

The same operations are preferably performed for each image of the cycle so as finally to obtain in the present case 10 tridimensional intermediate representations.

The next step consists, as illustrated in FIG. 3, in formulating for two successive intermediate tridimensional representations RT1 and RT2 for example, a law of spatial deformation making it possible to formulate a model of deformation between the two tridimensional representations RT1 and RT2. The same operations are performed in a general manner so as to obtain between two successive intermediate representations RTi and RTj a model of geometrical deformation LDIj.

By way of example, one manner of obtaining such a law of spatial deformation, representative of the movement of the heart between two successive temporal occurrences, can be performed by a conventional technique for tracking elements of interest (for example a specific vessel) between the various successive tridimensional representations.

Such matching techniques are, for example, described in the article by A. Singh and P.K. Allen, entitled "Image flow computation: an estimation theoretic framework and a unified perspective", Computer Vision Graphics and Image Processing, vol. 56, number 2, September 1992, pages 152–177. The person skilled in the art may optionally refer thereto.

Once all the spatial deformation laws have been obtained, a final tridimensional representation RTF of the vessels of the heart is reconstructed by applying the iterative image reconstruction algorithm and this time using all the initial images acquired IMi in the course of the total duration of acquisition. Moreover, the iterative image reconstruction algorithm will successively take into account, from one initial image to another, the corresponding spatial deformation law previously formulated in such a way as ultimately to obtain a correct representation of the vessels of the heart, given the latter's movement.

From a hardware point of view, in addition to the conventional snapshot apparatus, the device allowing the implementation of the process includes a computer implementing the various software means such as the iterative image reconstruction algorithm and equipped with a screen for displaying the final projected images obtained on the basis of the final tridimensional representation.

Moreover, although all the initial images of the cycle have been taken into account so as to formulate as many intermediate tridimensional representations, it would have been possible to take just one out of two, or one out of three into account so as to formulate fewer intermediate representations. This would however have led to less accurate spatial deformation laws.

Various modifications in structure and/or steps and/or function may be made by one skilled in the art without departing from the scope of the invention.

What is claimed is:

1. A process for reconstructing a tridimensional image of an object moving with a substantially cyclic motion, in which, for an acquisition duration extending over several cycles of the movement of the object, an acquisition of a plurality of initial digital radiographic images (IMi) is performed using a snapshot apparatus rotating around the object, initial images having the same temporal occurrence in the course of each cycle are selected respectively in successive cycles in such a way as to form a group of images which is associated with this same temporal occurrence, several different groups of initial images corresponding respectively to several different temporal occurrences are formed, an intermediate tridimensional representation of the object (RTi) is reconstructed on the basis of each group of initial images and of an iterative image reconstruction algorithm, a law of spatial deformation (LDIj) between two intermediate tridimensional representations is formulated on the basis of the two intermediate tridimensional representations corresponding to two successive temporal occurrences, and a final tridimensional representation of the object is reconstructed on the basis of the initial images successively acquired, of the spatial deformation laws successively formulated and of an iterative image reconstruction algorithm.

2. The process according to claim 1 wherein the images having the same temporal occurrence are selected in successive cycles by using an auxiliary control signal (ECG) representative of the cyclic motion of the object.

3. A process for reconstructing an image of an object moving with a substantially cyclic motion comprising the steps of:

acquiring a plurality of initial images for a predetermined duration of the cyclic motion, the initial images having the same temporal occurrence in the course of each cycle;

selecting at least one image respectively in successive cycles associated with the same temporal occurrence to for a group of images;

forming several different groups of initial images corresponding to respectively to several different temporal occurrences;

reconstructing an intermediate tridimensional representation of the object based on each group of initial images in accordance with an iterative image reconstruction algorithm;

formulating a law of spatial deformation between two intermediate tridimensional representations corresponding to two successive temporal occurrences; and reconstructing a final tridimensional representation on the basis of the initial images successively acquired, the successively formulated laws of spatial deformation and the iterative image reconstruction algorithm.

4. The process of claim 3 wherein in successive cycles, the image being the same temporal occurrence is selected by a signal representative of the cyclic motion.

5. The process of claim 3 wherein the acquisition of the initial images is performed continuously for the predetermined duration.

6. The process according to claim 3 wherein the law of spatial deformation is performed by tracking elements of interest between successive tridimensional representations.

7. The process of claim 3 wherein for all of the selected images in the cycle a model of geometrical deformation is formulated by the law of spatial deformation for each of two successive intermediate representations.

8. The process of claim 3 wherein all of the initial images of the cycle are used to formulate the intermediate tridimensional representation.

* * * * *